US009110966B2

(12) United States Patent
Brewer et al.

(10) Patent No.: US 9,110,966 B2
(45) Date of Patent: Aug. 18, 2015

(54) MANAGING REPLICATED DATA

(71) Applicant: International Business Machines Corporation, Armonk, NY (US)

(72) Inventors: Billy S. Brewer, Ewa Beach, HI (US); Kavita Chavda, Roswell, GA (US); Nagapramod S. Mandagere, San Jose, CA (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/509,096

(22) Filed: Oct. 8, 2014

(65) Prior Publication Data

US 2015/0026129 A1    Jan. 22, 2015

Related U.S. Application Data

(63) Continuation of application No. 13/683,370, filed on Nov. 21, 2012, now Pat. No. 8,898,113.

(51) Int. Cl.
 *G06F 17/30* (2006.01)
(52) U.S. Cl.
 CPC ...... *G06F 17/30575* (2013.01); *G06F 17/3053* (2013.01); *G06F 17/30312* (2013.01); *G06F 17/30619* (2013.01)
(58) Field of Classification Search
 CPC ......... G06F 19/18; G06F 19/20; G06F 19/22; G06F 17/3012; G06F 17/30377; G06F 17/30424; G06F 11/1402; G06F 19/24; G06F 8/45; G06F 8/456; G06F 9/4881; G06F 11/3466; G06F 11/3644; G06F 11/3664
 USPC ............. 702/19, 20, 21; 705/36 R, 12, 14.17, 705/14.36, 3, 36 T, 7.31; 706/14, 27, 46; 707/607, 623, 756, 769; 712/E9.002, 712/E9.045, 200, 34; 717/127, 129, 148, 717/149
 See application file for complete search history.

(56) References Cited

U.S. PATENT DOCUMENTS 7,085,755 B2   8/2006   Bluhm et al.
7,401,087 B2   7/2008   Copperman et al.
(Continued)

FOREIGN PATENT DOCUMENTS

WO   2011130706   10/2011

OTHER PUBLICATIONS

Office Action (Mail Date Apr. 11, 2014) for U.S. Appl. No. 13/683,370, filed Nov. 21, 2012; Confirmation No. 7701.
(Continued)

*Primary Examiner* — Jay Morrison
*Assistant Examiner* — Ken Hoang
(74) *Attorney, Agent, or Firm* — Schmeiser, Olsen & Watts; Matthew Chung

(57) ABSTRACT

An approach for managing replicated data is presented. Metadata is received specifying inter-data correlation(s), inter-replica correlation(s), and data-replica correlation(s) among replicas generated for a system. A unified replication metadata model specifying the correlations is generated. Based on the inter-replica correlation(s), a proper subset of the replicas is selected. Based on the inter-replica and inter-data correlation(s), the selected proper subset of replicas is indexed to generate a unified content index. A query is received to locate a data item in at least one of the replicas. Based on the unified content index, the unified replication metadata model, and the query, candidate replica(s) and confidence score(s) indicating likelihood(s) that the candidate replica(s) include the data item are determined. Based on temporal distance(s) and percent change(s) between first and second replica(s), confidence score(s) of the second replica(s) are determined.

19 Claims, 8 Drawing Sheets

(56) References Cited

U.S. PATENT DOCUMENTS

| | | |
|---|---|---|
| 7,792,789 B2 | 9/2010 | Prahlad et al. |
| 7,840,572 B2 | 11/2010 | Cutts et al. |
| 7,882,077 B2 | 2/2011 | Gokhale et al. |
| 7,941,431 B2 | 5/2011 | Bluhm et al. |
| 8,117,215 B2 | 2/2012 | Forman et al. |
| 8,898,113 B2 | 11/2014 | Brewer et al. |
| 2007/0011147 A1 | 1/2007 | Falkenberg |
| 2007/0226535 A1 | 9/2007 | Gokhale |
| 2011/0137886 A1 | 6/2011 | Wen et al. |
| 2011/0307304 A1 | 12/2011 | Mercuri |
| 2012/0078894 A1 | 3/2012 | Jiang et al. |
| 2012/0166513 A1 | 6/2012 | Fortune et al. |
| 2014/0143207 A1 | 5/2014 | Brewer et al. |

OTHER PUBLICATIONS

Amendment filed Jun. 24, 2014 in response to Office Action (Mail Date Apr. 11, 2014) for U.S. Appl. No. 13/683,370, filed Nov. 21, 2012; Confirmation No. 7701.

Notice of Allowance (Mail Date Jul. 16, 2014) for U.S. Appl. No. 13/683,370, filed Nov. 21, 2012; Confirmation No. 7701.

MANAGING REPLICATED DATA

This application is a continuation application claiming priority to Ser. No. 13/683,370 filed Nov. 21, 2012.

TECHNICAL FIELD

The present invention relates to a data processing method and system for managing replicated data, and more particularly to optimal indexing and searching of replicated data.

BACKGROUND

Resiliency or data protection of enterprise data in a system is a complex task, achieved by deploying a combination of known and different replication-based strategies for replicating the enterprise data. Multiple sets of metadata provided by these different replication-based strategies are separately managed and stored by different replication utilities and tools. The exact combination of replication-based strategies varies based on the type of data protection, availability of resources, and performance overhead thresholds. Furthermore, replication-based strategies evolve over time and according to changes in values of data. Moreover, the use of multiple replication-based strategies leads to a requirement for multiple administrators and multiple hardware and software stacks to implement the strategies. Because of the complexity of the replication-based strategies, finding a recovery point or recoverable replica in a case of disaster recovery is difficult due to replication metadata being spread across the multiple replication-based strategies. Correlating this replication metadata across the multiple strategies is a nontrivial matter. Further, finding the required application or user data may require mounting and restoring of recovery points and checking for the existence of the data in a trial-and-error manner until the required recovery point is found, thereby significantly increasing the recovery time and impacting system availability and downtime. The usability and effectiveness of a replication strategy depends on the speed of recovery (i.e., identifying and restoring the replica that includes the desired data item) and the impact on production (i.e., the length of time windows required for backup and replication, and the impact on instantaneous production throughput). Known approaches to indexing replicated data involve brute force crawling or mining of a complete dataset to extract or build an index of keywords and storing the index in a memory or other computer data repository. The known indexing approaches are data intensive operations that impact system resource usage and/or production applications. A known approach of indexing replicas one-by-one or in-parallel has a significant impact on system resource usage because the rate at which replicas are generated is relatively high due to aggressive resiliency requirements. In many systems, replicated content may be growing about 10 times as fast as the regular data and/or the replicated content may be 10 to 20 times the size of the regular data. Known in-band indexing and out-of-band indexing approaches are also data intensive operations.

BRIEF SUMMARY

In first embodiments, the present invention provides a method of managing replicated data. The method includes a computer receiving first metadata specifying correlation(s) (inter-data correlation(s)) between sets of replicated data in a first set of replicas. The method further includes the computer receiving second metadata specifying correlation(s) (inter-replica correlation(s)) between replicas included in a second set of replicas. The method further includes the computer receiving third metadata specifying correlation(s) (data-replica correlation(s)) between set(s) of replicated data and respective replica(s) included in a third set of replicas. The first, second and third sets of replicas are included in a plurality of replicas generated for a system. The method further includes the computer generating a unified replication metadata model specifying the inter-data correlation(s) based on the first metadata, the inter-replica correlation(s) based on the second metadata, and the data-replica correlation(s) based on the third metadata. The method further includes, based on the inter-replica correlation(s) specified by the unified replication metadata model, the computer selecting a proper subset of replicas included in the plurality of replicas. The method further includes, based on the inter-replica and inter-data correlation(s) specified by the unified replication metadata model, the computer indexing the selected proper subset of replicas to generate a unified content index. The method further includes the computer receiving a query to locate a data item in at least one replica included in the plurality of replicas. The method further includes, based on the unified content index, the unified replication metadata model, and the received query, the computer determining candidate replica(s) and corresponding confidence score(s). The confidence score(s) indicate respective likelihood(s) that the candidate replica(s) include the data item. The candidate replica(s) are included in the plurality of replicas.

In second embodiments, the present invention provides a computer-readable, tangible storage device and a computer-readable program code stored in the computer-readable, tangible storage device. The computer-readable program code contains instructions that are carried out by a central processing unit (CPU) of a computer system to implement a method of managing replicated data. The method includes the computer system receiving first metadata specifying correlation(s) (inter-data correlation(s)) between sets of replicated data in a first set of replicas. The method further includes the computer system receiving second metadata specifying correlation(s) (inter-replica correlation(s)) between replicas included in a second set of replicas. The method further includes the computer system receiving third metadata specifying correlation(s) (data-replica correlation(s)) between set(s) of replicated data and respective replica(s) included in a third set of replicas. The first, second and third sets of replicas are included in a plurality of replicas generated for a system. The method further includes the computer system generating a unified replication metadata model specifying the inter-data correlation(s) based on the first metadata, the inter-replica correlation(s) based on the second metadata, and the data-replica correlation(s) based on the third metadata. The method further includes, based on the inter-replica correlation(s) specified by the unified replication metadata model, the computer system selecting a proper subset of replicas included in the plurality of replicas. The method further includes, based on the inter-replica and inter-data correlation(s) specified by the unified replication metadata model, the computer system indexing the selected proper subset of replicas to generate a unified content index. The method further includes the computer system receiving a query to locate a data item in at least one replica included in the plurality of replicas. The method further includes, based on the unified content index, the unified replication metadata model, and the received query, the computer system determining candidate replica(s) and corresponding confidence score(s). The confidence score(s) indicate respective likelihood(s) that the candidate replica(s) include the data item. The candidate replica(s) are included in the plurality of replicas.

In third embodiments, the present invention provides a process for supporting computing infrastructure. The process includes providing at least one support service for at least one of creating, integrating, hosting, maintaining, and deploying computer-readable code in a computer system including a processor. The processor carries out instructions contained in the code causing the computer system to perform a method of managing replicated data. The method includes the computer system receiving first metadata specifying correlation(s) (inter-data correlation(s)) between sets of replicated data in a first set of replicas. The method further includes the computer system receiving second metadata specifying correlation(s) (inter-replica correlation(s)) between replicas included in a second set of replicas. The method further includes the computer system receiving third metadata specifying correlation(s) (data-replica correlation(s)) between set(s) of replicated data and respective replica(s) included in a third set of replicas. The first, second and third sets of replicas are included in a plurality of replicas generated for a system. The method further includes the computer system generating a unified replication metadata model specifying the inter-data correlation(s) based on the first metadata, the inter-replica correlation(s) based on the second metadata, and the data-replica correlation(s) based on the third metadata. The method further includes, based on the inter-replica correlation(s) specified by the unified replication metadata model, the computer system selecting a proper subset of replicas included in the plurality of replicas. The method further includes, based on the inter-replica and inter-data correlation(s) specified by the unified replication metadata model, the computer system indexing the selected proper subset of replicas to generate a unified content index. The method further includes the computer system receiving a query to locate a data item in at least one replica included in the plurality of replicas. The method further includes, based on the unified content index, the unified replication metadata model, and the received query, the computer system determining candidate replica(s) and corresponding confidence score(s). The confidence score(s) indicate respective likelihood(s) that the candidate replica(s) include the data item. The candidate replica(s) are included in the plurality of replicas.

Embodiments of the present invention significantly simplify and optimize the process of recovery by facilitating unified and optimal indexing and search of replicated content.

DETAILED DESCRIPTION

Overview

Embodiments of the present invention allow generating a unified replication metadata model that unifies metadata about multiple replicas created by different replication or backup tools at different points in time, selecting a proper subset of the multiple replicas, indexing only the selected subset of replicas, and generating a unified content index based on the indexing of the subset. To find a desired data item in one of the multiple replicas, embodiments of the present invention allow a query of the unified content index to find which replica includes the desired data item, which minimizes recovery time by eliminating a need to restore and scan data in each and every replica to find the desired data item. Embodiments of the present invention provide an indexing strategy that results in data recovery that is significantly faster than known techniques, while keeping impact on production lower than the known techniques.

Known techniques of indexing replicated content are time-consuming and resource intensive, which interferes with resources being available for other system activities, thereby posing unique challenges. At least one of these unique challenges is overcome by one or more embodiments of the present invention.

System for Managing Replicated Data

Figure 1:
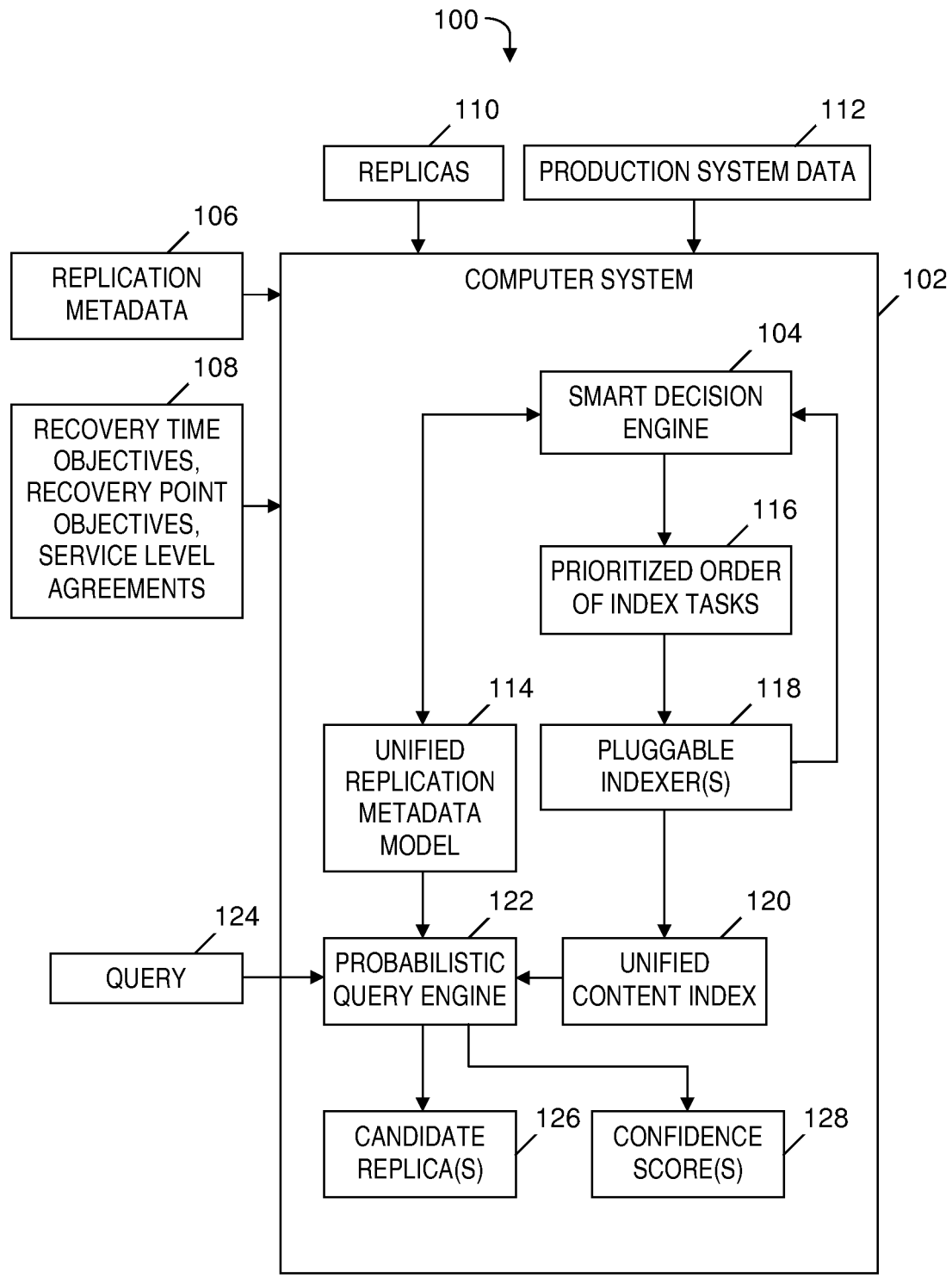
FIG. 1 is a block diagram of a system for managing replicated data, in accordance with embodiments of the present invention.

FIG. 1 is a block diagram of a system for managing replicated data, in accordance with embodiments of the present invention. System 100 includes a computer system 102, which runs a software-based smart decision engine 104. Computer system 102 receives replication metadata 106, recovery time objectives (RTOs), recovery point objectives (RPOs), and service level agreements (SLAs) 108. Computer system 102 also receives replicas 110 and production system data 112.

In one embodiment, replicas 110 includes multiple sets of replicated data created by using respective multiple data protection strategies, and replication metadata 106 includes multiple sets of metadata generated by the respective multiple data protection strategies.

Production system data 112 may include (1) event monitoring data that specifies system-wide events (i.e., changes in the production system for which replicas 110 were created) and (2) performance monitoring data that measures or otherwise specifies a current performance or current utilization of the production system.

Smart decision engine 104 generates a unified replication metadata model 114 that specifies inter-data correlation(s), inter-replica correlation(s) and data-replica correlation(s).

The inter-data correlation(s) correlate sets of replication data included in replicas 110. In one embodiment, the correlated sets of replication data are sets of replicated production data. In order to relate the sets of replication data, smart decision engine 104 may determine labels of different types of production data (e.g., data, log or index types). The inter-data correlation(s) identify a relationship between sets of replication data (e.g., Data set 1 is a log of Data set 2) and relate attributes of different sets of replication data. For example, the attributes may include the owner of the data, a consistency requirement for the data, data relatives, and replicas of the data.

The inter-replica correlation(s) correlate replicas in a first subset of replicas 110. In one embodiment, an inter-replica correlation indicates that one replica and another replica are replicas of the same production data.

The data-replica correlation(s) correlate set(s) of replicated data included in replicas 110 and respective replica(s) included in a second subset of replicas 110. For example, a data-replica correlation may relate Replica 1 and Data Type X, which indicates that Replica 1 is a replica of data of Data type X.

Based on replicas 110, RTOs, RPOs and SLAs 108, and production system data 112, smart decision engine 104 determines a proper subset (not shown) of replicas 110 to be indexed. Based on unified replication metadata model 114, smart decision engine 104 generates a prioritized order of index tasks 116 to index the aforementioned proper subset of replicas 110. Smart decision engine 104 determines pluggable indexer(s) 118 to perform the aforementioned index tasks in prioritized order 116 on the proper subset of replicas 110. Pluggable indexer(s) 118 perform the index tasks in prioritized order 116 on the proper subset of replicas 110 to generate a unified content index 120. Unified content index 120 includes keyword-to-replica mappings for the aforementioned proper subset of replicas 110. That is, unified content index 120 indicates how many times a keyword occurs in a particular replica.

Computer system 102 also runs a software-based probabilistic query engine 122, which receives a query 124 to locate a data item in at least one of the replicas included in replicas 110. In one embodiment, query 124 specifies a data item to be located in a replica and a type of the data item (i.e., an entity name and an entity type). In response to query 124, probabilistic query engine 122 uses unified replication metadata model 114 and unified content index 120 to generate candidate replica(s) 126. Candidate replica(s) 126 are replica(s) included in replicas 110 that potentially include the data item specified in query 124. Also in response to query 124, probabilistic query engine 122 uses unified replication model 114, system-wide events included in production system data 112 and fully indexed replica(s) that are temporally nearest to candidate replica(s) 126 to generate confidence score(s) 128 corresponding to candidate replica(s) 126. Confidence score(s) 128 indicate likelihood(s) that respective candidate replica(s) 126 include the data item specified in query 124.

The functionality of the components shown in FIG. 1 is described in more detail in the discussions of FIGS. 2-6 and FIG. 8 presented below.

Process for Managing Replicated Data

Figure 2:
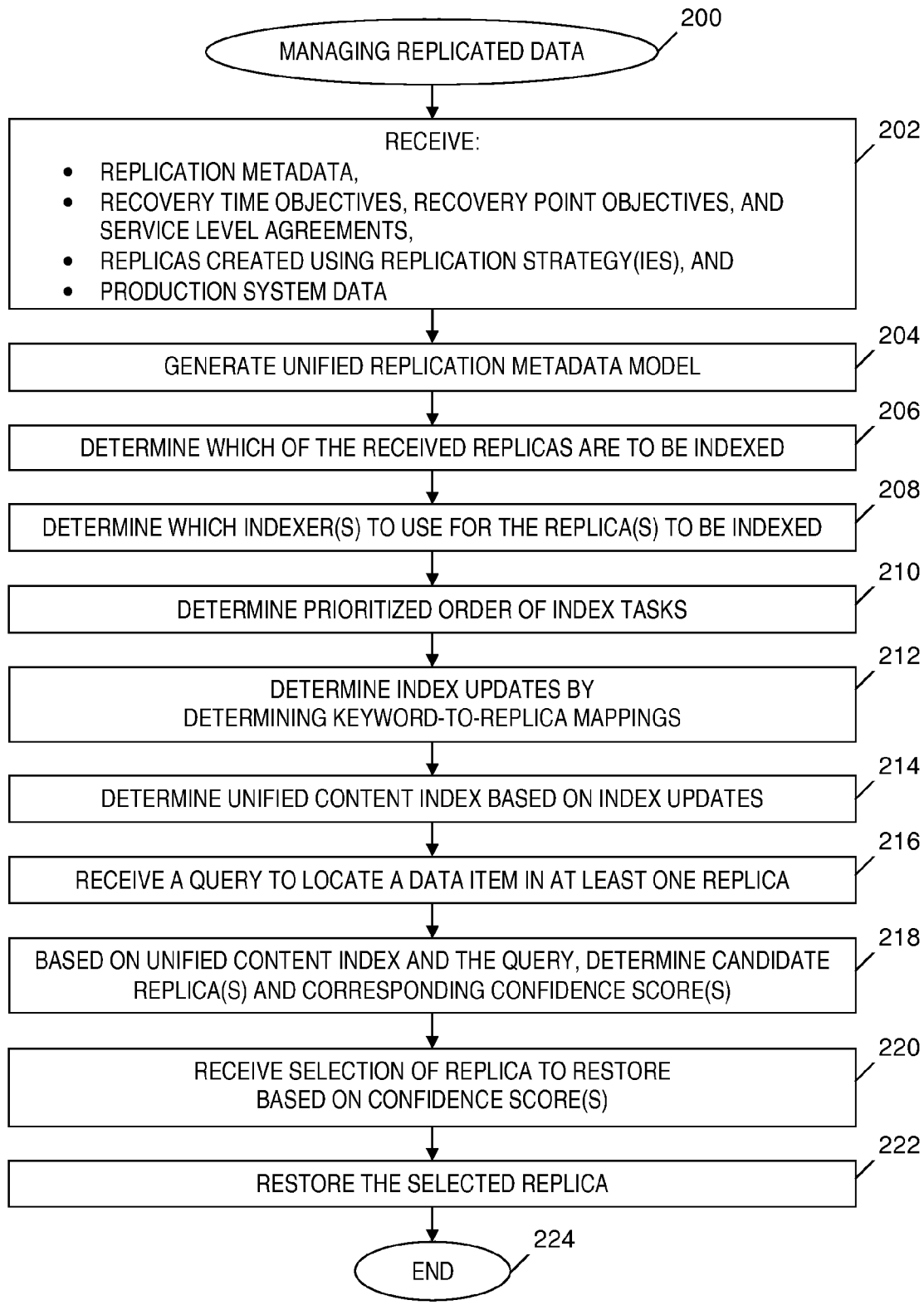
FIG. 2 is a flowchart of a process of managing replicated data, where the process is implemented in the system of FIG. 1, in accordance with embodiments of the present invention.

FIG. 2 is a flowchart of a process of managing replicated data, where the process is implemented in the system of FIG. 1, in accordance with embodiments of the present invention. The process of managing replicated data begins at step 200. In step 202, smart decision engine 104 (see FIG. 1) receives replication metadata 106 (see FIG. 1), RTOs, RPOs, and SLAs 108 (see FIG. 1), replicas 110 (see FIG. 1), and production system data 112 (see FIG. 1). Replication metadata 106 (see FIG. 1) may include backup metadata, mirroring metadata, snapshot metadata, and/or continuous data protection (CDP) metadata.

An example of backup metadata may include metadata provided by Tivoli Storage Manager (TSM), NetBackup® and/or EMC NetWorker backup and recovery software. The TSM enterprise-level data backup and recovery software package is offered by International Business Machines Corporation located in Armonk, N.Y. The NetBackup® backup and recovery software suite is offered by Symantec Corporation located in Mountain View, Calif. The EMC® Networker® (formerly Legato Networker®) is an enterprise-level suite of data protection software offered by EMC Corporation located in Hopkinton, Mass.

An example of mirroring metadata may include metadata provided by Metro Mirror (i.e., Peer to Peer Remote Copy), Global Mirror, and/or Symmetrix Remote Data Facility (SRDF). Metro Mirror is software for providing synchronous data replication, and is offered by International Business Machines Corporation. Global Mirror is software for providing asynchronous data replication, and is offered by International Business Machines Corporation. SRDF is software for providing data replication, and is offered by EMC Corporation.

Examples of replicas 110 (see FIG. 1) received in step 202 may include data backups provided by TSM, a mirror of data provided by Metro Mirror, and a data backup provided by CDP.

In step 204, smart decision engine 104 (see FIG. 1) generates unified replication metadata model 114 (see FIG. 1) based on replication metadata 106 (see FIG. 1), which is received in step 202. Unified replication metadata model 114 (see FIG. 1) specifies inter-data correlation(s), inter-replica correlation(s) and data-replica correlation(s), as described above in the discussion of FIG. 1.

Unified replication metadata model 114 (see FIG. 1) is a common source of metadata across various replication solutions and various production applications and production data. For instance, an application server running on a virtual machine hosting a database could be replicated or backed up in multiple, different ways, such as virtual machine level replication/cloning/snapshotting; disk based mirroring of data stores; and TSM file based backup. By capturing and maintaining correlated information from the multiple, different replication solutions in unified replication metadata model 114 (see FIG. 1), data recovery processes are facilitated, as discussed below with respect to steps performed by probabilistic query engine 122 (see FIG. 1).

In step 206, smart decision engine 104 (see FIG. 1) determines a proper subset of replica(s) to be indexed. The proper subset of replica(s) is determined in step 206 by smart decision engine 104 (see FIG. 1) selecting the proper subset from replicas 110 (see FIG. 1). Smart decision engine 104 (see FIG. 1) selects the aforementioned proper subset from replicas 110 (see FIG. 1) based on RTOs, RPOs and SLAs 108 (see FIG. 1) and based on production system data 112 (see FIG. 1).

In one embodiment, the selection of the proper subset from replicas 110 (see FIG. 1) is part of an indexing framework that is tunable based on RTOs and performance overheads specified in SLAs, where the RTOs and SLAs are included in RTOs, RPOs and SLAs 108 (see FIG. 1). The selection of the proper subset from replicas 110 (see FIG. 1) allows intelligent sampling of indexing candidates (see step 208) that is superior in time and resource requirements compared to brute force techniques that include exhaustive crawling of all replicas.

In one embodiment, smart decision engine 104 (see FIG. 1) receives a system-wide change threshold and subsequently determines amounts of system-wide changes that occur between timestamps of different pairs of replicas included in replicas 110 (see FIG. 1). If smart decision engine 104 (see FIG. 1) determines that an amount of system-wide changes that occurred between timestamps of a pair of replicas does not exceed the system-wide change threshold, then smart decision engine 104 (see FIG. 1) selects one replica in the pair to be included in the aforementioned proper subset and determines that the other replica in the pair is not to be included in the proper subset. Smart decision engine 104 (see FIG. 1) determines the aforementioned pairs of replicas by determining which replicas are correlated in the unified replication metadata model 114 (see FIG. 1). For example, a production system has backups 1, 2, ... 7 for the last seven days and smart decision engine 104 (see FIG. 1) determines that there was very little system-wide change between backups 2 and 3 (i.e., the amount of system-wide change between backups 2 and 3 does not exceed the change threshold). In this example, smart decision engine 104 (see FIG. 1) decides to index backup 2, but not backup 3.

In one embodiment, smart decision engine 104 (see FIG. 1) selects replicas for the proper subset based on computing resource availability. If smart decision engine 104 (see FIG. 1) determines that the available computing resources are sufficient to index only m replicas out of the n replicas included in replicas 110 (see FIG. 1), where m<n, then in step 206, smart decision engine 104 (see FIG. 1) selects only the m replicas for the aforementioned proper subset.

In step 208, smart decision engine 104 (see FIG. 1) determines which pluggable indexer(s) 118 (see FIG. 1) are to be used to index (i.e., determine index updates of) the respective replica(s) in the proper subset determined in step 206. The pluggable indexer(s) may include, for example, a DB2® indexer and a custom indexer. In one embodiment, smart decision engine 104 (see FIG. 1) determines the pluggable indexer(s) 118 (see FIG. 1) in step 208 based on the inter-data correlation(s) and data-replica correlation(s) included in unified replication metadata model 114 (see FIG. 1).

In one embodiment, in step 208, smart decision engine 104 (see FIG. 1) dynamically determines the timing (i.e., schedule) of indexing tasks. That is, smart decision engine 104 (see FIG. 1) determines whether each replica is to be indexed online (also known as (a.k.a.) in-band; i.e., while data is being replicated), offline (a.k.a. out-of-band; i.e., after data replication is completed), or with a technique that is a hybrid of online and offline, based on a system load value received by smart decision engine 104 (see FIG. 1).

In one embodiment, in step 208, smart decision engine 104 (see FIG. 1) intelligently decides whether the index tasks are to be performed in-band, out-of-band, or with a hybrid technique by making use of workload models of the index tasks, a performance overhead threshold, and real time monitoring data of the production system, where the monitoring data is included in production system data 112 (see FIG. 1). The performance overhead threshold may be included in an SLA, which is included in RTOs, RPOs and SLAs 108 (see FIG. 1). The real time monitoring data may be included in production system data 112 (see FIG. 1).

In step 210, smart decision engine 104 (see FIG. 1) determines prioritized order of index tasks 116 (see FIG. 1) based on unified replication metadata model 114 (see FIG. 1).

Prior to step 212, smart decision engine 104 (see FIG. 1) determines the type of index tasks to be performed. In one embodiment, in step 212, smart decision engine 104 (see FIG. 1) dynamically decides the type of indexing to perform by retrieving application semantics from production system data 112 (see FIG. 1). For instance, based on application monitoring, smart decision engine 104 (see FIG. 1) differentiates between running a database catalog index operation and a full-fledged keyword-based index operation to output a set of index updates for particular replicas.

In step 212, smart decision engine 104 (see FIG. 1) determines index updates for the proper subset of replica(s) by determining keyword-to-replica mappings as index entries, using the pluggable indexer(s) determined in step 208 to perform the aforementioned index tasks in prioritized order 116 (see FIG. 1). In one embodiment, smart decision engine 104 (see FIG. 1) determines index updates in step 212 (i.e., target replica or production) based on unified replication metadata model 114 (see FIG. 1), RTOs, RPOs, and SLAs 108 (see FIG. 1), and performance monitoring data included in production system data 112 (see FIG. 1).

In step 214, smart decision engine 104 (see FIG. 1) determines unified content index 120 (see FIG. 1) based on the index updates determined in step 212. Unified content index 120 (see FIG. 1) significantly simplifies data recovery procedures by eliminating the need to look up and correlate multiple replication solutions.

In step 216, probabilistic query engine 122 (see FIG. 1) receives query 124 (see FIG. 1) to locate a data item in at least one of replicas 110 (see FIG. 1). In one embodiment, step 216 includes probabilistic query engine 122 (see FIG. 1) receiving query 124 (see FIG. 1), which specifies a data item and a type of the data item, where the specified data item is to be located in at least one of replicas 110 (see FIG. 1). In one embodiment, query 124 (see FIG. 1) is received in step 216 as part of a data recovery process. For example, step 216 receives query 124 (see FIG. 1) as a request to locate and restore a data table XYZ in Replica 1, Replica 2, and/or Replica 3.

In step 218, based on query 124 (see FIG. 1), unified content index 120 (see FIG. 1) and unified replication metadata model 114 (see FIG. 1), probabilistic query engine 122 (see FIG. 1) determines candidate replica(s) 126 (see FIG. 1). In one embodiment, candidate replica(s) 126 (see FIG. 1) are replica(s) included in replicas 110 (see FIG. 1) that potentially include the data item specified in query 124 (see FIG. 1).

Step 218 also includes probabilistic query engine 122 (see FIG. 1) determining confidence score(s) 128 (see FIG. 1), which are associated with candidate replica(s) 126 (see FIG. 1) in a one-to-one correspondence. Confidence score(s) 128 (see FIG. 1) or candidate replica(s) are determined in step 218 based on respective nearest fully indexed replica(s), unified replication metadata model 114 (see FIG. 1) and system-wide events included in production system data 112 (see FIG. 1). Confidence score(s) 128 (see FIG. 1) indicate a probability or likelihood that respective candidate replica(s) 126 (see FIG. 1) include the data item specified in query 124 (see FIG. 1).

In one embodiment, probabilistic query engine 122 (see FIG. 1) serves a variety of queries including query 124 (see FIG. 1) regarding lifetime or existence of keyword/index items in given replica(s) with certain bounded confidence estimates. Probabilistic query engine 122 (see FIG. 1) has a probabilistic nature of because at any given point in time, smart decision engine 104 (see FIG. 1) may not have indexed all relevant replicas due to time or resource constraints. At such points in time, probabilistic query engine 122 (see FIG. 1) infers or extrapolates from an index state of related replicas and system-wide events.

In step 220, computer system 102 (see FIG. 1) receives a selection (e.g., a selection by a user) of a replica to be restored, where the selected replica is included in replicas 110

(see FIG. 1), and where the selection is based at least in part on confidence score(s) 128 (see FIG. 1).

In step 222, computer system 102 (see FIG. 1) restores the replica whose selection is received in step 220. The restoration of the replica in step 222 restores the data item specified in query 124 (see FIG. 1), which was received in step 216. Following step 222, the process of FIG. 2 ends at step 224.

In one embodiment, smart decision engine 104 (see FIG. 1) attempts to solve the following optimization problem in the process of FIG. 2:

Objective Functions:
Maximize the number of index entries extracted specified by (entity name, entity type, start time, end time, replica identifiers (IDs))
Minimize the number of false positives (i.e., entities with incorrect lifetimes and/or incorrect replica associations)
Constraint Functions:
Resource usage or resource cost<first threshold value
Production performance impact<second threshold value
Inputs:
Replicas to be indexed, which are included in replicas 110 (see FIG. 1)
Replication metadata 106 (see FIG. 1) from multiple sources
Event monitoring metadata included in production system data 112 (see FIG. 1), and which indicates system-wide events
Application data correlation (e.g., Log, Data, Index, etc.)
Output:
Index updates specified by (entity name, entity type, start time, end time, replica IDs)

Processing by Smart Decision Engine

Figure 3:
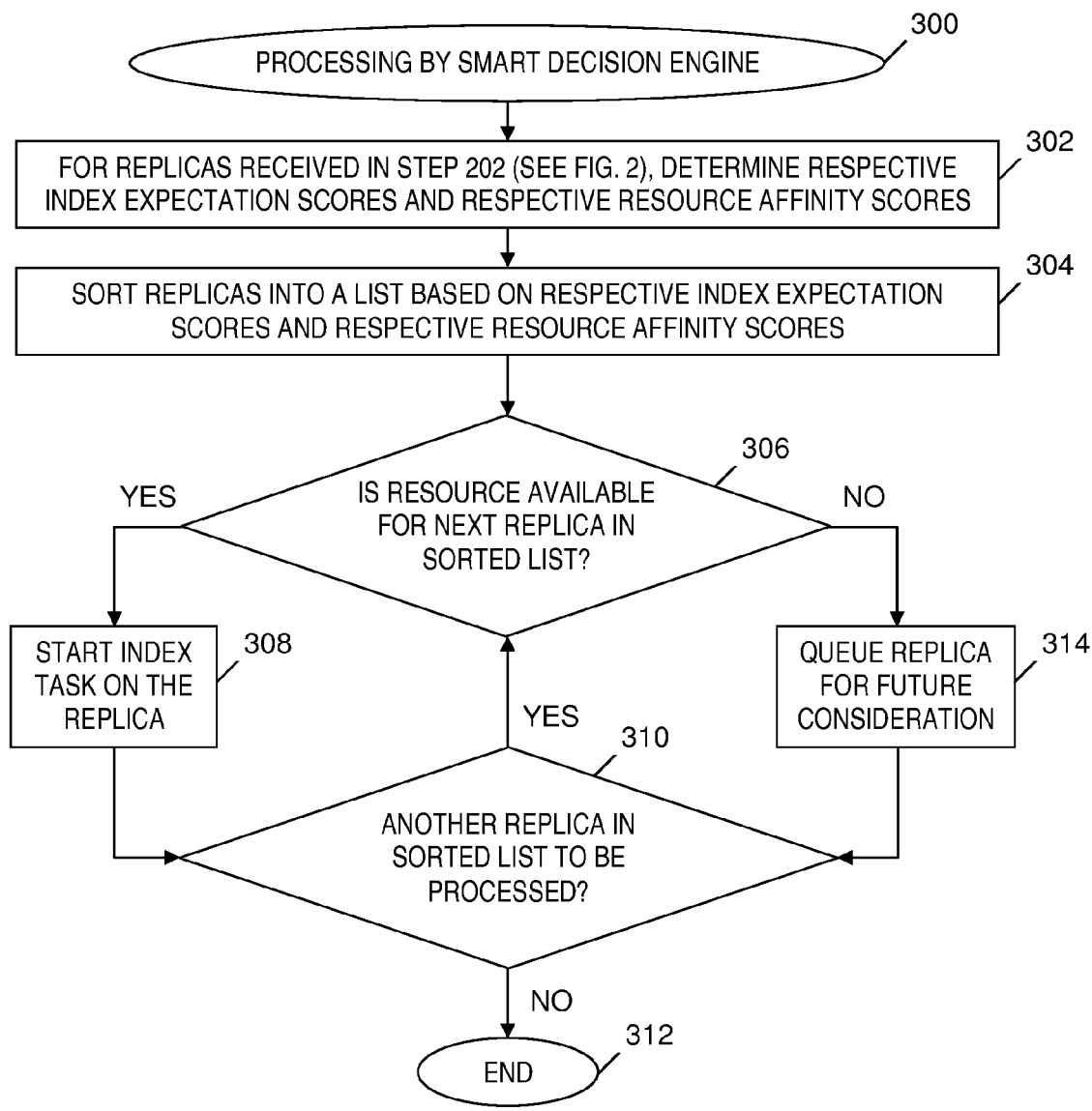
FIG. 3 is a flowchart of processing performed by a smart decision engine, where the processing is included in the process of FIG. 2 and the smart decision engine is included in the system of FIG. 1, in accordance with embodiments of the present invention.

FIG. 3 is a flowchart of processing performed by a smart decision engine, where the processing is included in the process of FIG. 2 and the smart decision engine is included in the system of FIG. 1, in accordance with embodiments of the present invention. In one embodiment, the process of FIG. 3 is included in step 212 (see FIG. 2). The process of FIG. 3 starts at step 300. In step 302, for each replica received in step 202 (see FIG. 2), smart decision engine 104 (see FIG. 1) determines a corresponding index expectation score and a corresponding resource affinity score.

In step 304, smart decision engine 104 (see FIG. 1) generates a sorted list of replicas 110 (see FIG. 1) received in step 202 (see FIG. 2), where the sorting of replicas 110 (see FIG. 1) is based on respective index expectation scores determined in step 302 and respective resource affinity scores determined in step 302.

In one embodiment, prior to generating the sorted list in step 304, smart decision engine 104 (see FIG. 1) weights the index expectation scores and the resource affinity scores determined in step 302. Subsequently, in step 304, smart decision engine 104 (see FIG. 1) generates the sorted list of replicas 110 (see FIG. 1), where the sorting is further based on the aforementioned weights.

In step 306, smart decision engine 104 (see FIG. 1) determines whether a computing resource is available to perform an index task for a next replica (i.e., the replica being processed) in the sorted list generated in step 304. If step 306 determines that a resource is available to perform the index task for the replica being processed (i.e., the resource is not already assigned to another task), then the Yes branch of step 306 is taken and step 308 is performed.

In step 308, smart decision engine 104 (see FIG. 1) starts the index task on the replica being processed.

In step 310, smart decision engine 104 (see FIG. 1) determines whether there is another replica in the sorted list generated in step 304 that is not yet processed by step 306. If step 310 determines that there is another replica that is not yet processed by step 306, then the Yes branch of step 310 is taken and the process of FIG. 3 loops back to inquiry step 306. Otherwise, if step 310 determines that there is not another replica in the sorted list generated in step 304 that is not yet processed by step 306, then the No branch of step 310 is taken and the process of FIG. 3 ends at step 312.

Returning to inquiry step 306, if smart decision engine 104 (see FIG. 1) determines that no computing resource is available to perform the index task for the replica being processed, then the No branch of step 306 is processed and step 314 is performed.

In step 314, smart decision engine 104 (see FIG. 1) queues the replica being processed for future consideration and the process of FIG. 3 continues with inquiry step 310, as described above.

Determining an Index Expectation Score

Figure 4:
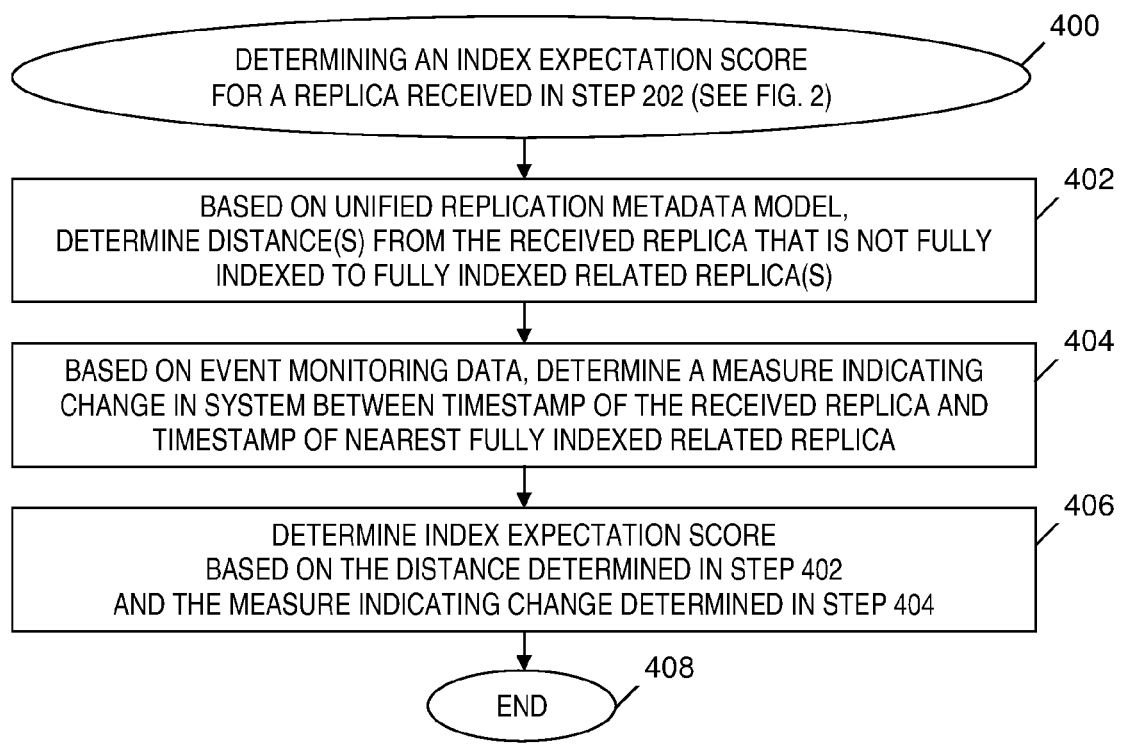
FIG. 4 is a flowchart of a process of determining an index expectation score for a replica received in the process of FIG. 2, where the index expectation score determination process is included in the process of FIG. 3, in accordance with embodiments of the present invention.

FIG. 4 is a flowchart of a process of determining an index expectation score for a replica, where the index expectation score determination process is included in the process of FIG. 3, in accordance with embodiments of the present invention. In one embodiment, the process of FIG. 4 is included in step 302 (see FIG. 3). The process of FIG. 4 begins at step 400. In step 402, based on unified replication metadata model 114 (see FIG. 1), smart decision engine 104 (see FIG. 1) determines distance(s) from a received replica to related replica(s). The aforementioned received replica is one of replicas 110 (see FIG. 1) received in step 202 (see FIG. 2), which is not fully indexed. The aforementioned related replica(s) are already fully indexed replica(s) that are included in replicas 110 (see FIG. 1).

In one embodiment, prior to step 402, smart decision engine 104 (see FIG. 1) identifies the aforementioned related replica(s) (i.e., replica(s) related to the received replica) by determining that unified replication metadata model 114 includes inter-replica correlation(s) between the received replica and the related replica(s).

In one embodiment, the distance(s) determined in step 402 are temporal distance(s) that include respective difference(s) between the timestamp of the received replica and respective timestamp(s) of the related replica(s). Smart decision engine 104 (see FIG. 1) retrieves the aforementioned timestamps from unified replication metadata model 114 (see FIG. 1).

In step 404, based on event monitoring data included in production system data 112 (see FIG. 1), smart decision engine 104 (see FIG. 1) determines a measure indicating an amount of change in the production system for which replicas 110 (see FIG. 1) were generated. The measure determined in step 404 indicates an amount of change in the system that occurs between the timestamp of the aforementioned received replica and a timestamp of the nearest fully indexed related replica (i.e., the related replica whose generation is temporally nearest to the generation of the received replica). Smart decision engine 104 (see FIG. 1) retrieves the measure indicating the amount of change from production system data 112 (see FIG. 1). In one embodiment, the measure indicating change determined in step 404 is a percent of data items in the system that have changed between the timestamp of the aforementioned received replica and a timestamp of the nearest fully indexed related replica.

In step 406, smart decision engine 104 (see FIG. 1) determines the index expectation score for the received replica based on the distance to the nearest fully indexed related replica determined in step 402 and based on the measure indicating the change in the system determined in step 404. Following step 406, the process of FIG. 4 ends at step 408.

Determining a Resource Affinity Score

Figure 5:
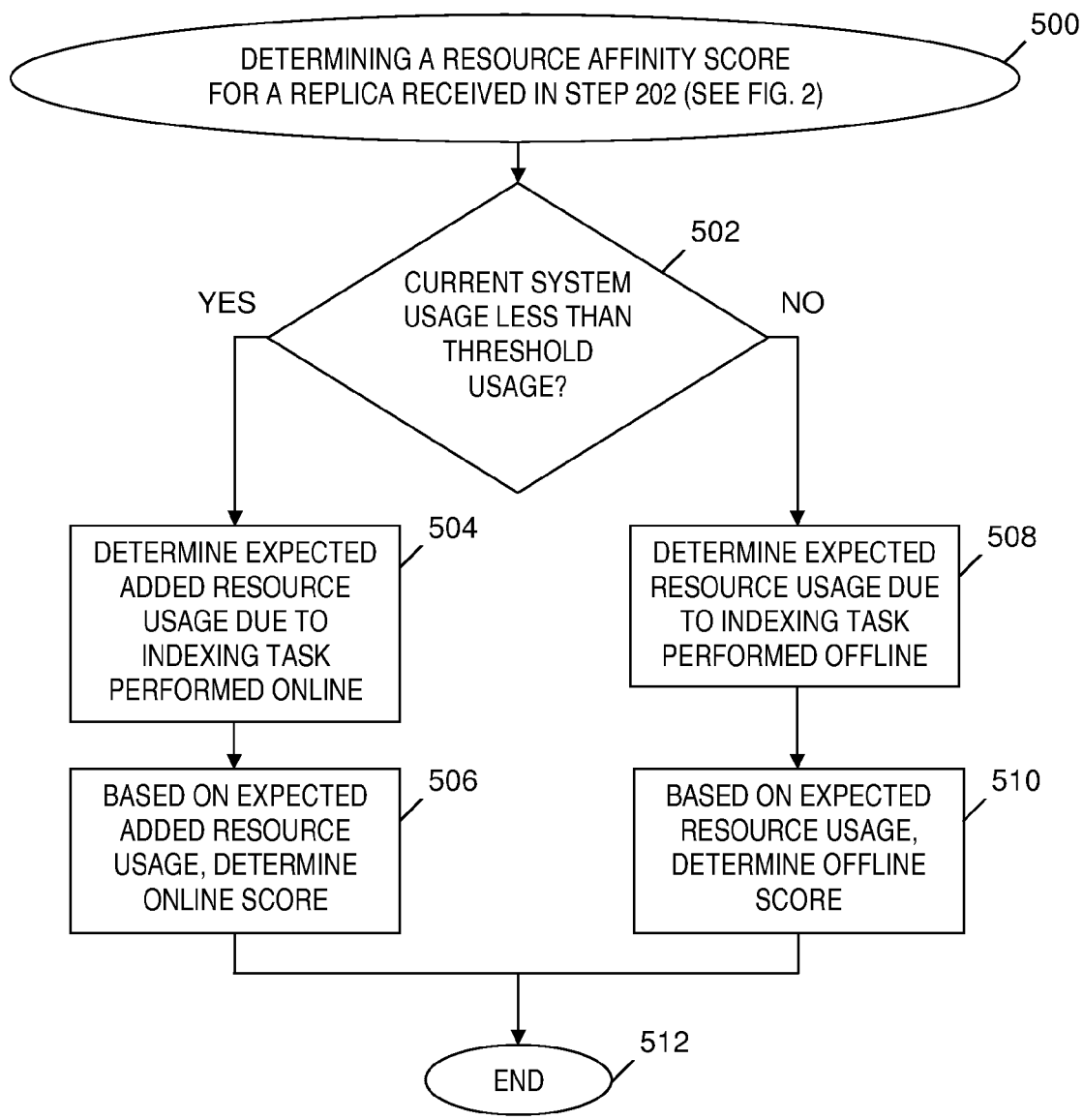
FIG. 5 is a flowchart of a process of determining a resource affinity score for a replica received in the process of FIG. 2, where the resource affinity score determination process is included in the process of FIG. 3, in accordance with embodiments of the present invention.

FIG. 5 is a flowchart of a process of determining a resource affinity score for a replica, where the resource affinity score determination process is included in the process of FIG. 3, in accordance with embodiments of the present invention. In one embodiment, the process of FIG. 5 is included in step 302 (see FIG. 3). The process of FIG. 5 starts at step 500. In step 502, smart decision engine 104 (see FIG. 1) determines whether the current usage (i.e., current system usage) of computing resources in the production system for which replicas 110 (see FIG. 1) were generated is less than a threshold usage value. If step 502 determines that the current system usage is less than the threshold usage value (i.e., the current system usage is low enough to allow a new indexing task), then smart decision engine 104 (see FIG. 1) determines that the indexing of the replica can be performed online, the Yes branch of step 502 is taken, and step 504 is performed.

In step 504, smart decision engine 104 (see FIG. 1) determines an expected additional resource usage due to an indexing task being performed online.

In step 506, based on the expected additional resource usage determined in step 504, smart decision engine 104 (see FIG. 1) determines an online resource affinity score for performing the indexing task online.

Returning to step 502, if smart decision engine 104 (see FIG. 1) determines that the current system usage is greater than or equal to the threshold usage value (i.e., the current system usage is not low enough to allow a new indexing task), then smart decision engine 104 (see FIG. 1) determines that the indexing of the replica must be performed offline, the No branch of step 502 is taken, and step 508 is performed.

In step 508, smart decision engine 104 (see FIG. 1) determines an expected resource usage due to performing an indexing task offline.

In step 510, based on the expected resource usage determined in step 508, smart decision engine 104 (see FIG. 1) determines an offline resource affinity score for performing the indexing task offline.

Following step 506 and step 510, the process of FIG. 5 ends at step 512.

Determining Candidate Replica(s) and Confidence Score(s)

Figure 6:
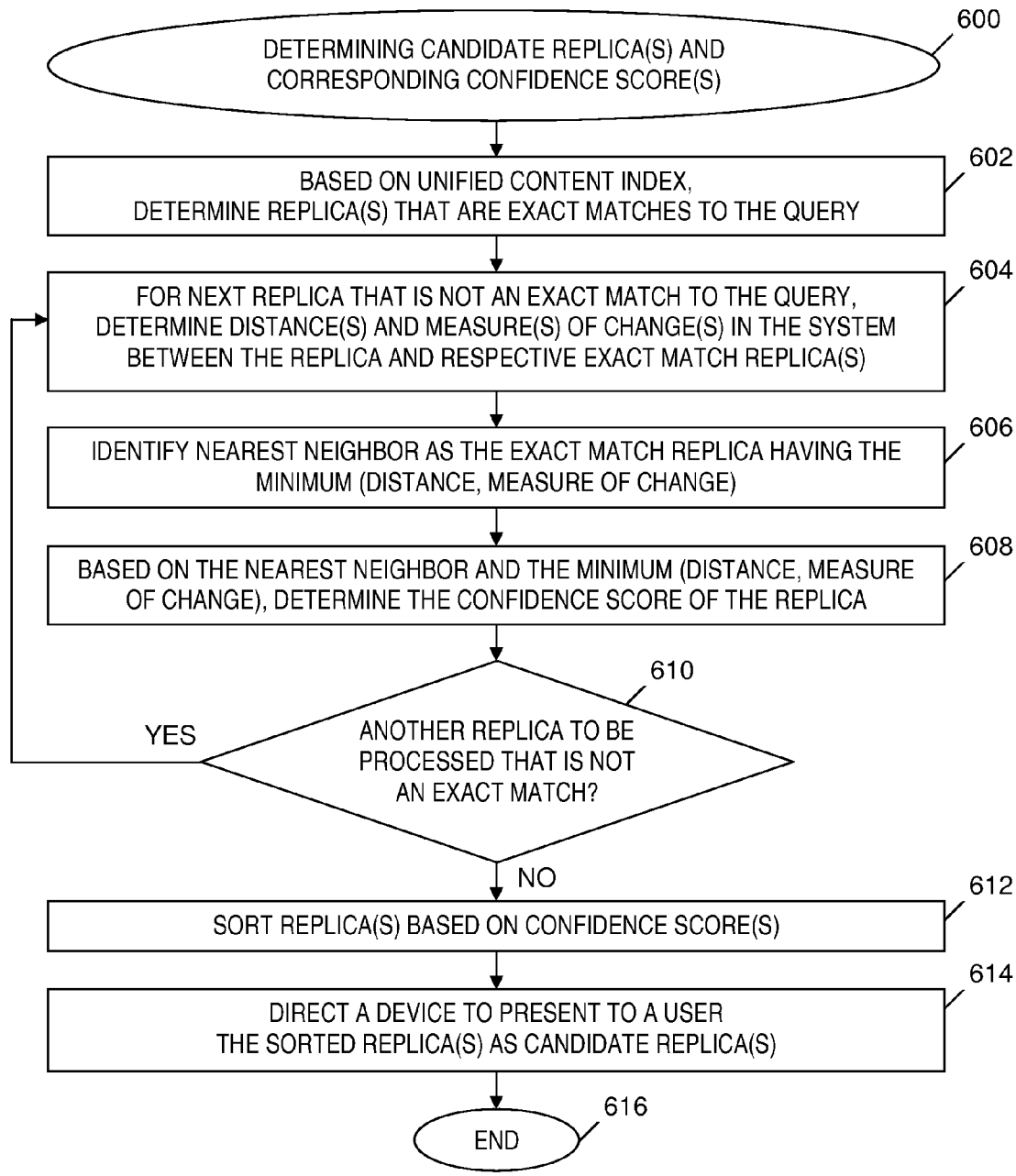
FIG. 6 is a flowchart of a process of determining candidate replica(s) and corresponding confidence score(s), where the process is included in the process of FIG. 2, in accordance with embodiments of the present invention.

FIG. 6 is a flowchart of a process of determining candidate replica(s) and corresponding confidence score(s), where the process is included in the process of FIG. 2, in accordance with embodiments of the present invention. In one embodiment, the process of FIG. 6 is included in step 218 (see FIG. 2). The process of FIG. 6 starts at step 600. In step 602, based on unified content index 120 (see FIG. 1) probabilistic query engine 122 (see FIG. 1) determines replica(s) included in replicas 110 (see FIG. 1) that are exact matches to query 124 (see FIG. 1) (i.e., replica(s) that are fully indexed and definitely have the data item specified in query 124 (see FIG. 1) based on the index). In one embodiment, probabilistic query engine 122 (see FIG. 1) assigns the highest confidence score (e.g., 100% probability) to each of the replica(s) determined in step 602 because these replica(s) definitely include the data item specified in query 124 (see FIG. 1).

In step 604, for a next replica (i.e., the replica being processed) included in replicas 110 (see FIG. 1) that is not an exact match to query 124 (see FIG. 1), probabilistic query engine 122 (see FIG. 1) determines distance(s) and measure(s) indicating amount(s) of change(s) in the production system for which replicas 110 (see FIG. 1) were generated. The distance(s) determined in step 604 are between the replica being processed and replica(s) included in replicas 110 (see FIG. 1) that are exact matches to query 124 (see FIG. 1). The measure(s) of change(s) determined in step 604 measure change(s) in the system between the timestamp of the replica being processed and the timestamp(s) of replica(s) that are included in replicas 110 (see FIG. 1) and that are exact matches to query 124 (see FIG. 1).

In one embodiment, the distance(s) determined in step 604 are temporal distance(s) that include respective difference(s) between the timestamp of the replica being processed and respective timestamp(s) of the replica(s) that are included in replicas 110 (see FIG. 1) and that are exact matches to query 124 (see FIG. 1).

In one embodiment, the measure(s) indicating amount(s) of change(s) determined in step 604 is a percent of data items in the system that have changed between the timestamp of the aforementioned replica being processed and respective timestamp(s) of the replica(s) that are included in replicas 110 (see FIG. 1) and that are exact matches to query 124 (see FIG. 1).

In step 606, probabilistic query engine 122 (see FIG. 1) identifies a nearest neighbor to the replica being processed as the replica that exactly matches query 124 (see FIG. 1) and that has the minimum (distance, measure of change), where the distance and measure of change are determined in step 604. In one embodiment, step 606 includes probabilistic query engine 122 (see FIG. 1) identifying the replica that has the minimum (distance, percent change) as the nearest neighbor. If there is a "tie" between a first replica and a second replica (i.e., the first replica has the minimum distance and the second replica has the minimum percent change), then probabilistic query engine 122 (see FIG. 1) breaks the tie by selecting either the first or the second replica as the replica that is designated as having the minimum (distance, percent change). In one embodiment, in the case of the aforementioned "tie" between the first and second replicas, probabilistic query engine 122 (see FIG. 1) selects the first or second replica by using a probabilistic process. In one embodiment, the aforementioned probabilistic process includes probabilistic query engine 122 (see FIG. 1) simulating a coin flip to select either the first or the second replica as the replica that is designated as having the minimum (distance, percent change).

In step 608, based on the nearest neighbor and minimum (distance, measure of change), probabilistic query engine 122 (see FIG. 1) determines the confidence score of the replica being processed. The confidence score determined in step 608 is inversely proportional to the distance and to the measure of change determined in step 604.

For example, consider a fully indexed replica (i.e., Replica 3) is generated on Day 3 and confidence scores are determined for Replica 1 generated on Day 1 and Replica 2 generated on Day 2. Because the temporal distance between Replica 1 and the fully indexed Replica 3 (i.e., two days) is greater than the temporal distance between Replica 2 and Replica 3 (i.e., one day), then the confidence score of Replica 1 is less than the confidence score of Replica 2.

As another example, consider fully indexed replicas (i.e., Replicas 5 and 10) are generated on Day 5 and Day 10 and confidence scores are determined for Replica 4 generated on Day 4 and Replica 9 generated on Day 9. In this example, probabilistic query engine 122 (see FIG. 1) receives a first amount of system-wide changes that occurred between Day 4 and Day 5 and a second amount of system-wide changes that occurred between Day 9 and Day 10, where the first amount is less than the second amount, and where the amounts of system-wide changes are received by probabilistic query engine 122 (see FIG. 1) from production system data 112 (see FIG. 1). For instance, production system data 112 (see FIG. 1) indicates that the number of data tables added and the number of other data tables deleted between Day 9 and Day 10 is significantly more than the data tables added and deleted between Day 4 and Day 5. Based on the first amount of system-wide changes being less than the second amount of system-wide changes, the confidence score for Replica 4 is greater than the confidence score for Replica 9.

In one embodiment, because the confidence score determined in step 608 is for a replica that does not exactly match query 124 (see FIG. 1), the confidence score indicates a probability that is less than a certainty that the replica includes the data item specified in query 124 (see FIG. 1) (i.e., the confidence score determined in step 608 indicates less than 100% probability that the replica includes the data item).

In step 610, probabilistic query engine 122 (see FIG. 1) determines whether there is another replica in replicas 110 (see FIG. 1) that has not yet been processed in step 604 and that is not an exact match to query 124 (see FIG. 1). If step 610 determines that there is another replica to be processed that is not an exact match to query 124 (see FIG. 1), then the Yes branch of step 610 is taken and the process of FIG. 6 loops back to step 604 to process the next replica that is not an exact match to query 124 (see FIG. 1). Otherwise, if step 610 determines that there is not another replica to be processed that is not an exact match to query 124 (see FIG. 1), then the No branch of step 610 is taken and step 612 is performed.

In step 612, based on the confidence score(s) 128 (see FIG. 1), probabilistic query engine 122 (see FIG. 1) sorts the replica(s) processed in the one or more performances of step 604 (i.e., sorts candidate replica(s) 126 (see FIG. 1)).

In step 614, probabilistic query engine 122 (see FIG. 1) directs a device (e.g., display device) to present to a user the sorted replica(s) as candidate replica(s) 126 (see FIG. 1) that potentially include the data item specified in query 124 (see FIG. 1). In one embodiment, probabilistic query engine 122 (see FIG. 1) directs the device in step 614 to present to the user the sorted candidate replica(s) 126 (see FIG. 1) and the corresponding confidence score(s) 128 (see FIG. 1). Following step 614, the process of FIG. 6 ends at step 616.

EXAMPLE

Figure 7:
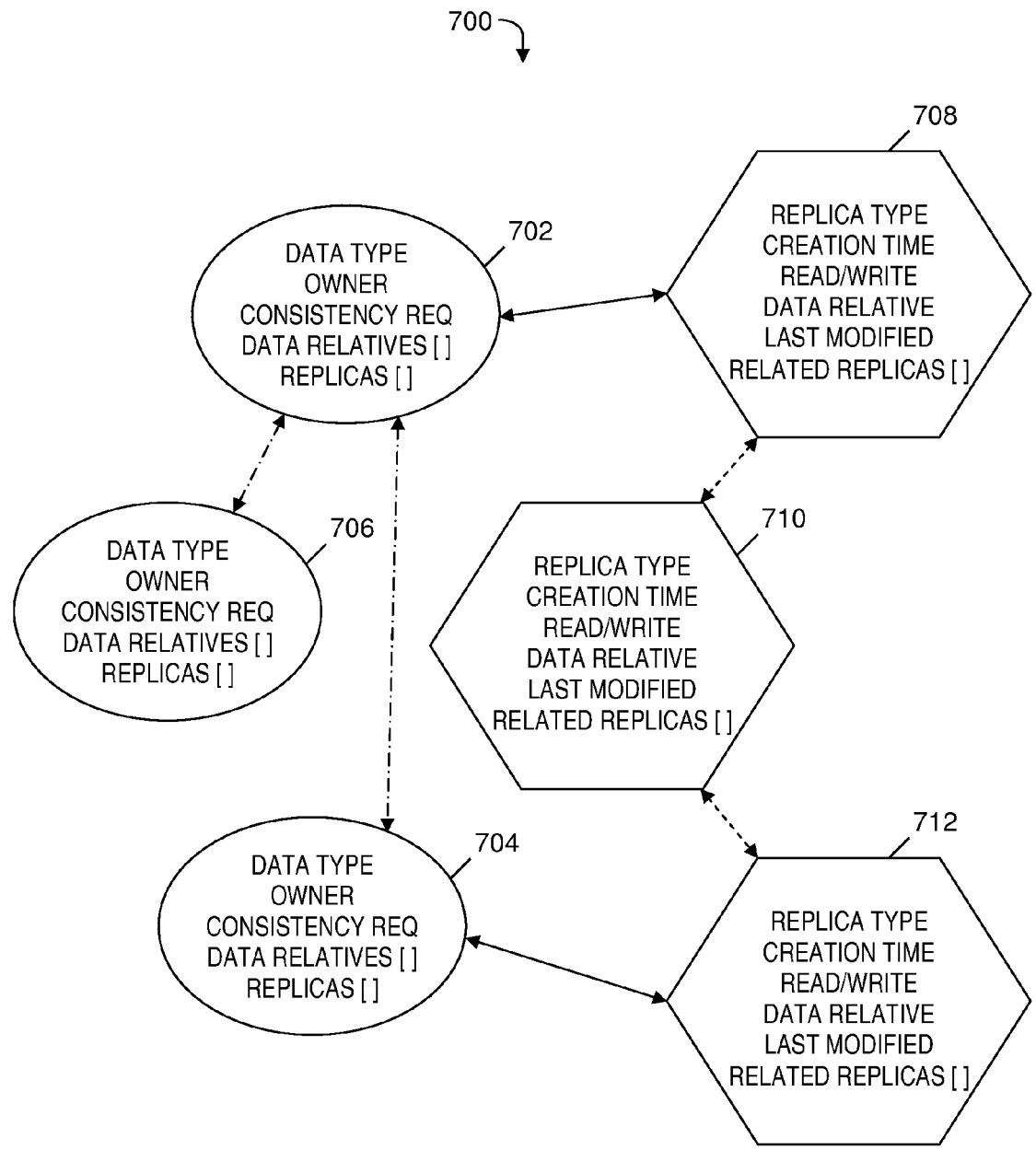
FIG. 7 is an example of a unified replication metadata model included in the system of FIG. 1, in accordance with embodiments of the present invention.

FIG. 7 is an example of a unified replication metadata model included in the system of FIG. 1, in accordance with embodiments of the present invention. A model 800 is an example of unified replication metadata model 114 (see FIG. 1), and includes data types 702, 704 and 706, and further includes replica types 708, 710 and 712. For each data type 702, 704, 706, the labels "owner," "consistency req," "data relatives [ ]," and "replicas [ ]" are examples of different types of production data. For each replica type 708, 710 and 712, the labels "creation time," "read/write," "data relative," last modified," and "related replicas [ ]" are examples of attributes of a replica.

The solid-lined, two-headed arrows between data type 702 and replica type 708 and between data type 704 and replica type 712 indicate data-replica correlations. For example, the arrow between data type 702 and replica type 708 indicates that the replica of replica type 708 is a replica having data of data type 702. The dashed-lined, two-headed arrows between replica type 708 and replica type 710 and between replica type 710 and replica type 712 indicate inter-replica correlations. For example, the arrow between replica types 708 and 710 indicates that the replica of replica type 708 and the replica of replica type 710 are replicas of the same production data. The dash-dot lined arrows between data type 702 and data type 706 and between data type 702 and data type 704 indicate inter-data correlations.

Computer System

Figure 8:
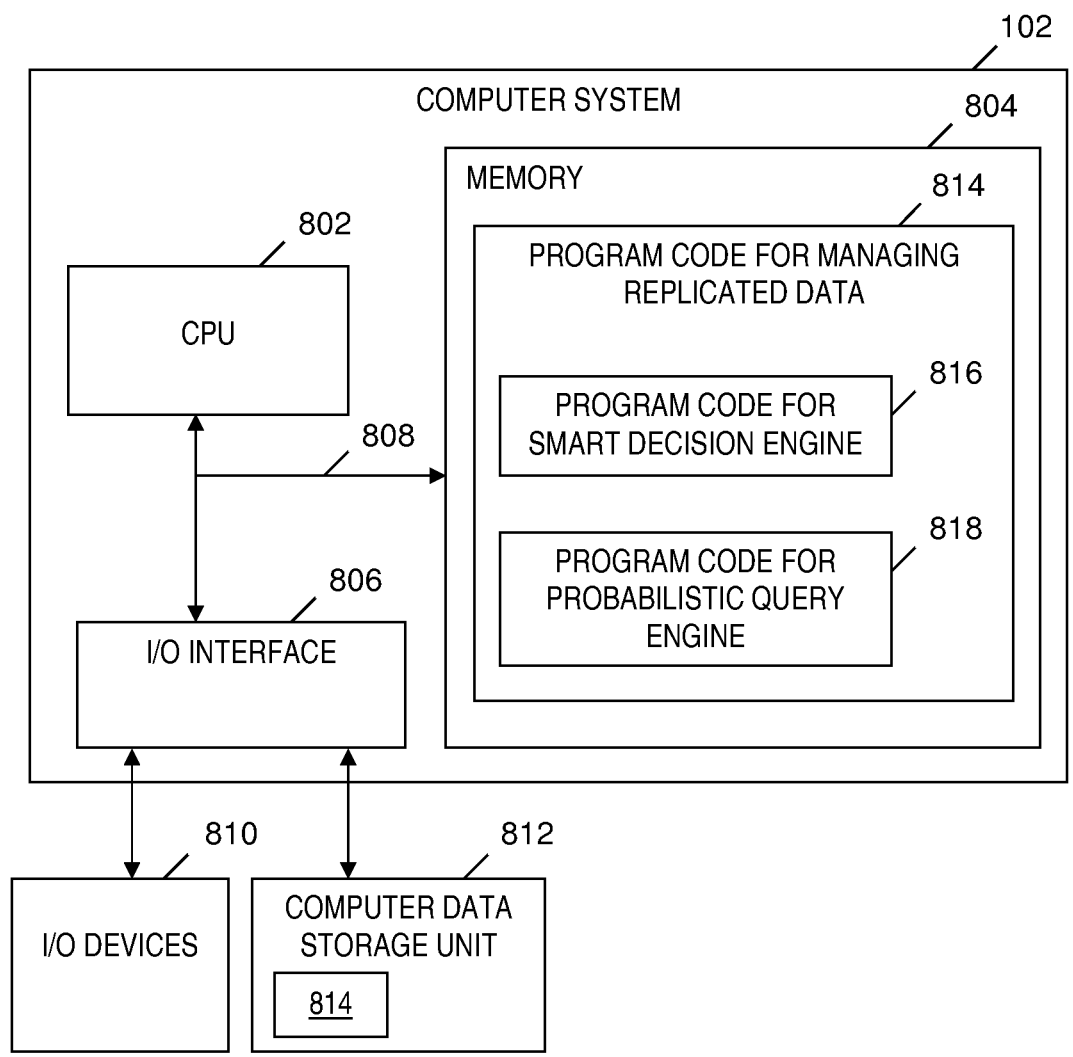
FIG. 8 is a block diagram of a computer system that is included in the system of FIG. 1 and that implements the processes of FIG. 2, FIG. 3, FIG. 4, FIG. 5 and FIG. 6, in accordance with embodiments of the present invention.

FIG. 8 is a block diagram of a computer system that is included in the system of FIG. 1 and that implements the processes of FIG. 2, FIG. 3, FIG. 4, FIG. 5, and FIG. 6, in accordance with embodiments of the present invention. Computer system 102 generally includes a central processing unit (CPU) 802, a memory 804, an input/output (I/O) interface 806, and a bus 808. Further, computer system 102 is coupled to I/O devices 810 and a computer data storage unit 812. CPU 802 performs computation and control functions of computer system 102, including carrying out instructions included in program code 814 to perform a method of managing replicated data, where the instructions are carried out by CPU 802 via memory 804. CPU 802 may include a single processing unit, or be distributed across one or more processing units in one or more locations (e.g., on a client and server). Program code 814 includes program code 816 for smart decision engine 104 (see FIG. 1) and program code 818 for probabilistic query engine 122 (see FIG. 1).

Memory 804 may include any known computer-readable storage medium, which is described below. In one embodiment, cache memory elements of memory 804 provide temporary storage of at least some program code (e.g., program code 814) in order to reduce the number of times code must be retrieved from bulk storage while instructions of the program code are carried out. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device (e.g., monitor), keyboard, mouse, printer, speakers, handheld device, facsimile, etc. Bus 808 provides a communication link between each of the components in computer system 102, and may include any type of transmission link, including electrical, optical, wireless, etc.

I/O interface 806 also allows computer system 102 to store information (e.g., data or program instructions such as program code 814) on and retrieve the information from computer data storage unit 812 or another computer data storage unit (not shown). Computer data storage unit 812 may include any known computer-readable storage medium, which is described below. For example, computer data storage unit 812 may be a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are carried out by CPU 802 via memory 804 to manage replicated data. Although FIG. 8 depicts memory 804 as including program code 814, the present invention contemplates embodiments in which memory 804 does not include all of code 814 simultaneously, but instead at one time includes only a portion of code 814.

Further, memory 804 may include other systems not shown in FIG. 8, such as an operating system (e.g., Linux®) that runs on CPU 802 and provides control of various components within and/or connected to computer system 102. Linux is a registered trademark of Linus Torvalds in the United States, other countries, or both.

Storage unit 812 and/or one or more other computer data storage units (not shown) that are coupled to computer system 102 may store replication metadata 106 (see FIG. 1), recovery time objectives, recovery point objectives and service level agreements 108 (see FIG. 1), replicas 110 (see FIG. 1) and production system data 112 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 804 and/or computer data storage unit 812) having computer-readable program code (e.g., program code 814) embodied or stored thereon.

Any combination of one or more computer-readable mediums (e.g., memory 804 and computer data storage unit 812) may be utilized. The computer readable medium may be (1) a computer-readable storage medium or (2) a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 814) for use by or in connection with a system, apparatus, or device for carrying out instructions in the program, and which does not propagate.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 814) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 814) for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIG. 4, FIG. 5, and FIG. 6) and/or block diagrams of methods, apparatus (systems) (e.g., FIG. 1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 814). These computer program instructions may be provided to one or more hardware processors (e.g., CPU 802) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 804 or computer data storage unit 812) that can direct a computer (e.g., computer system 102), other programmable data processing apparatus, or other devices to function in a particular manner, such that the instructions (e.g., program 814) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 814) which are carried out on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to managing replicated data. Thus, an embodiment of the present invention discloses a process for supporting computer infrastructure, wherein the process includes providing at least one support service for at least one of integrating, hosting, maintaining and deploying computer-readable code (e.g., program code 814) in a computer system (e.g., computer system 102) including one or more processors (e.g., CPU 802), wherein the processor(s) carry out instructions contained in the code causing the computer system to manage replicated data.

While it is understood that program code 814 for managing replicated data may be deployed by manually loading directly in client, server and proxy computers (not shown) via loading a computer-readable storage medium (e.g., computer data storage unit 812), program code 814 may also be automatically or semi-automatically deployed into computer system 102 by sending program code 814 to a central server (e.g., computer system 102) or a group of central servers. Program code 814 is then downloaded into client computers (not shown) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

In one embodiment, program code 814 for managing replicated data, which consists of (1) program code 816 for smart decision engine 104 (see FIG. 1) and (2) program code 818 for probabilistic query engine 122 (see FIG. 1), is integrated into a client, server and network environment by providing for program code 814 to coexist with software applications (not shown), operating systems (not shown) and network operating systems software (not shown) and then installing program code 814 on the clients and servers in the environment where program code 814 will function.

The first step of the aforementioned integration of code included in program code 814 is to identify any software on the clients and servers including the network operating system (not shown) where program code 814 will be deployed that are required by program code 814 or that work in conjunction with program code 814. This identified software includes the network operating system that is software that enhances a basic operating system by adding networking features. Next, the software applications and version numbers are identified and compared to the list of software applications and version numbers that have been tested to work with program code 814. Those software applications that are missing or that do not match the correct version are upgraded with the correct version numbers. Program instructions that pass parameters from program code 814 to the software applications are checked to ensure the parameter lists match the parameter lists required by the program code 814. Conversely, parameters passed by the software applications to program code 814 are checked to ensure the parameters match the parameters required by program code 814. The client and server operating systems including the network operating systems are identified and compared to the list of operating systems, version numbers and network software that have been tested to work with program code 814. Those operating systems, version numbers and network software that do not match the list of tested operating systems and version numbers are upgraded on the clients and servers to the required level. After ensuring that the software, where program code 814 is to be deployed, is at the correct version level that has been tested to work with program code 814, the integration is completed by installing program code 814 on the clients and servers.

Another embodiment of the invention provides a method that performs the process steps on a subscription, advertising and/or fee basis. That is, a service provider, such as a Solution Integrator, can offer to create, maintain, support, etc. a process of managing replicated data. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, FIG. 4, FIG. 5, and FIG. 6 and the block diagrams in FIG. 1 and FIG. 8 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 814), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of managing replicated data, the method comprising the steps of:
    a computer receiving first metadata specifying inter-data correlation(s), which are correlation(s) between sets of replicated data in a first set of replicas;
    the computer receiving second metadata specifying inter-data correlation(s), which are correlation(s) between replicas included in a second set of replicas;
    the computer receiving third metadata specifying data-replica correlation(s), which are correlation(s) between set(s) of replicated data and respective replica(s) included in a third set of replicas, the first, second and third sets of replicas being included in a plurality of replicas generated for a system;
    the computer generating a unified replication metadata model specifying the inter-data correlation(s) based on the first metadata, the inter-replica correlation(s) based on the second metadata, and the data-replica correlation(s) based on the third metadata;
    based on the inter-replica correlation(s) specified by the unified replication metadata model, the computer selecting a proper subset of replicas included in the plurality of replicas;

based on the inter-replica and inter-data correlation(s) specified by the unified replication metadata model, the computer indexing the selected proper subset of replicas to generate a unified content index;

the computer receiving a query to locate a data item in at least one replica included in the plurality of replicas; and based on the unified content index, the unified replication metadata model, and the received query, the computer determining candidate replica(s) and corresponding confidence score(s), the confidence score(s) indicating respective likelihood(s) that the candidate replica(s) include the data item, and the candidate replica(s) included in the plurality of replicas, wherein the step of determining the candidate replica(s) and the corresponding confidence score(s) includes the steps of:

based on the unified content index, the computer determining first replica(s) included in the proper subset of replicas that are exact matches to the query;

for second replica(s) that are not exact matches to the query, the computer determines respective temporal distance(s) and respective percent change(s) in the system between the second replica(s) and the first replica(s) that are exact matches to the query;

for the second replica(s) that are not exact matches to the query, the computer identifying respective nearest neighbor(s) as respective first replica(s) having minimum(s) of the respective temporal distance(s) and respective percent change(s);

based on the minimum(s) of the temporal distance(s) and percent change(s), the computer determining confidence score(s) of the second replica(s);

the computer sorting the second replica(s) based on the confidence score(s) of the second replica(s); and the computer directing a device to present the sorted second replica(s) to a user.

2. The method of claim 1, further comprising the steps of:
based on the inter-replica and inter-data correlation(s) specified by the unified replication metadata model, the computer determining indexer(s) to use for the indexing of the selected proper subset of replicas; and based on the inter-replica and inter-data correlation(s) specified by the unified replication metadata model, the computer determining a prioritized order of indexing tasks included in the step of indexing the selected proper subset of replicas.

3. The method of claim 1, wherein the step of the computer indexing the selected proper subset of replicas includes the steps of:
the computer determining index updates by determining keyword-to-replica mappings; and
the computer generating the unified content index based on the index updates.

4. The method of claim 3, wherein the step of determining the index updates includes the steps of:
the computer determining index expectation scores and resource affinity scores for respective replicas in the selected proper subset of replicas; and
the computer sorting the selected proper subset of replicas based on the respective index expectation scores and the respective resource affinity scores.

5. The method of claim 4, further comprising the step of the computer receiving event monitoring data that indicates change(s) in the system, wherein the step of determining the index expectation scores for respective replicas in the selected proper subset of replicas includes the steps of:
based on the unified replication metadata model, the computer determining temporal distances from the replicas in the selected proper subset of replicas to respective fully indexed replicas included in the plurality of replicas;

based on the received event monitoring data, the computer determining measures indicating respective amounts of change in the system between timestamps of replicas in the selected proper subset of replicas and respective nearest fully indexed replicas included in the plurality of replicas; and determining the index expectation scores based on the temporal distances and the measures indicating amounts of change in the system.

6. The method of claim 4, further comprising the step of the computer determining a current usage of resources in the system and a threshold usage of the resources, wherein the step of determining the resource affinity scores for respective replicas in the selected proper subset of replicas includes the steps of:
if the current usage is less than the threshold usage, then the computer determining an expected additional resource usage due to performing an indexing task online, and based on the expected additional resource usage, the computer determining a resource affinity score for performing the indexing task online; and
if the current usage is greater than or equal to the threshold usage, then the computer determining an expected resource usage due to performing the indexing task offline and based on the expected resource usage, the computer determining a resource affinity score for performing the indexing task offline.

7. The method of claim 1, further comprising the step of:
providing at least one support service for at least one of creating, integrating, hosting, maintaining, and deploying computer-readable program code in the computer, the program code being executed by a processor of the computer to implement the steps of receiving the first metadata, receiving the second metadata, receiving the third metadata, generating the unified replication metadata model, selecting the proper subset of replicas, indexing the selected proper subset, receiving the query, and determining the candidate replica(s).

8. A computer program product, comprising:
a computer-readable, tangible storage device; and
a computer-readable program code stored in the computer-readable, tangible storage device, the computer-readable program code containing instructions that are carried out by a central processing unit (CPU) of a computer system to implement a method of managing replicated data, the method comprising the steps of:
the computer system receiving first metadata specifying inter-data correlation(s), which are correlation(s) between sets of replicated data in a first set of replicas;
the computer system receiving second metadata specifying inter-data correlation(s), which are correlation(s) between replicas included in a second set of replicas;
the computer system receiving third metadata specifying data-replica correlation(s), which are correlation(s) between set(s) of replicated data and respective replica(s) included in a third set of replicas, the first, second and third sets of replicas being included in a plurality of replicas generated for a system;
the computer system generating a unified replication metadata model specifying the inter-data correlation(s) based on the first metadata, the inter-replica correlation(s) based on the second metadata, and the data-replica correlation(s) based on the third metadata;

based on the inter-replica correlation(s) specified by the unified replication metadata model, the computer system selecting a proper subset of replicas included in the plurality of replicas;

based on the inter-replica and inter-data correlation(s) specified by the unified replication metadata model, the computer system indexing the selected proper subset of replicas to generate a unified content index;

the computer system receiving a query to locate a data item in at least one replica included in the plurality of replicas; and based on the unified content index, the unified replication metadata model, and the received query, the computer system determining candidate replica(s) and corresponding confidence score(s), the confidence score(s) indicating respective likelihood(s) that the candidate replica(s) include the data item, and the candidate replica(s) included in the plurality of replicas, wherein the step of determining the candidate replica(s) and the corresponding confidence score(s) includes the steps of:

based on the unified content index, the computer system determining first replica(s) included in the proper subset of replicas that are exact matches to the query;

for second replica(s) that are not exact matches to the query, the computer system determines respective temporal distance(s) and respective percent change(s) in the system between the second replica(s) and the first replica(s) that are exact matches to the query;

for the second replica(s) that are not exact matches to the query, the computer system identifying respective nearest neighbor(s) as respective first replica(s) having minimum(s) of the respective temporal distance(s) and respective percent change(s);

based on the minimum(s) of the temporal distance(s) and percent change(s), the computer system determining confidence score(s) of the second replica(s);

the computer system sorting the second replica(s) based on the confidence score(s) of the second replica(s); and the computer system directing a device to present the sorted second replica(s) to a user.

9. The program product of claim 8, wherein the method further comprises the steps of:

based on the inter-replica and inter-data correlation(s) specified by the unified replication metadata model, the computer system determining indexer(s) to use for the indexing of the selected proper subset of replicas; and based on the inter-replica and inter-data correlation(s) specified by the unified replication metadata model, the computer system determining a prioritized order of indexing tasks included in the step of indexing the selected proper subset of replicas.

10. The program product of claim 8, wherein the step of the computer system indexing the selected proper subset of replicas includes the steps of:

the computer system determining index updates by determining keyword-to-replica mappings; and the computer system generating the unified content index based on the index updates.

11. The program product of claim 10, wherein the step of determining the index updates includes the steps of:

the computer system determining index expectation scores and resource affinity scores for respective replicas in the selected proper subset of replicas; and the computer system sorting the selected proper subset of replicas based on the respective index expectation scores and the respective resource affinity scores.

12. The program product of claim 11, wherein the method further comprises the step of the computer system receiving event monitoring data that indicates change(s) in the system, wherein the step of determining the index expectation scores for respective replicas in the selected proper subset of replicas includes the steps of:

based on the unified replication metadata model, the computer system determining temporal distances from the replicas in the selected proper subset of replicas to respective fully indexed replicas included in the plurality of replicas;

based on the received event monitoring data, the computer system determining measures indicating respective amounts of change in the system between timestamps of replicas in the selected proper subset of replicas and respective nearest fully indexed replicas included in the plurality of replicas; and determining the index expectation scores based on the temporal distances and the measures indicating amounts of change in the system.

13. The program product of claim 11, wherein the method further comprises the step of the computer system determining a current usage of resources in the system and a threshold usage of the resources, wherein the step of determining the resource affinity scores for respective replicas in the selected proper subset of replicas includes the steps of:

if the current usage is less than the threshold usage, then the computer system determining an expected additional resource usage due to performing an indexing task online, and based on the expected additional resource usage, the computer system determining a resource affinity score for performing the indexing task online; and if the current usage is greater than or equal to the threshold usage, then the computer system determining an expected resource usage due to performing the indexing task offline and based on the expected resource usage, the computer system determining a resource affinity score for performing the indexing task offline.

14. A computer system comprising:

a central processing unit (CPU);

a memory coupled to the CPU; and a computer-readable storage device coupled to the CPU, the storage device containing instructions that are executed by the CPU via the memory to implement a method of managing replicated data, the method comprising the steps of:

the computer system receiving first metadata specifying inter-data correlation(s), which are correlation(s) between sets of replicated data in a first set of replicas;

the computer system receiving second metadata specifying inter-data correlation(s), which are correlation(s) between replicas included in a second set of replicas;

the computer system receiving third metadata specifying data-replica correlation(s), which are correlation(s) between set(s) of replicated data and respective replica(s) included in a third set of replicas, the first, second and third sets of replicas being included in a plurality of replicas generated for a system;

the computer system generating a unified replication metadata model specifying the inter-data correlation(s) based on the first metadata, the inter-replica correlation(s) based on the second metadata, and the data-replica correlation(s) based on the third metadata;

based on the inter-replica correlation(s) specified by the unified replication metadata model, the computer system selecting a proper subset of replicas included in the plurality of replicas;

based on the inter-replica and inter-data correlation(s) specified by the unified replication metadata model, the computer system indexing the selected proper subset of replicas to generate a unified content index;

the computer system receiving a query to locate a data item in at least one replica included in the plurality of replicas; and based on the unified content index, the unified replication metadata model, and the received query, the computer system determining candidate replica(s) and corresponding confidence score(s), the confidence score(s) indicating respective likelihood(s) that the candidate replica(s) include the data item, and the candidate replica(s) included in the plurality of replicas, wherein the step of determining the candidate replica(s) and the corresponding confidence score(s) includes the steps of:

based on the unified content index, the computer system determining first replica(s) included in the proper subset of replicas that are exact matches to the query;

for second replica(s) that are not exact matches to the query, the computer system determines respective temporal distance(s) and respective percent change(s) in the system between the second replica(s) and the first replica(s) that are exact matches to the query;

for the second replica(s) that are not exact matches to the query, the computer system identifying respective nearest neighbor(s) as respective first replica(s) having minimum(s) of the respective temporal distance(s) and respective percent change(s);

based on the minimum(s) of the temporal distance(s) and percent change(s), the computer system determining confidence score(s) of the second replica(s);

the computer system sorting the second replica(s) based on the confidence score(s) of the second replica(s); and the computer system directing a device to present the sorted second replica(s) to a user.

15. The computer system of claim 14, wherein the method further comprises the steps of:

based on the inter-replica and inter-data correlation(s) specified by the unified replication metadata model, the computer system determining indexer(s) to use for the indexing of the selected proper subset of replicas; and based on the inter-replica and inter-data correlation(s) specified by the unified replication metadata model, the computer system determining a prioritized order of indexing tasks included in the step of indexing the selected proper subset of replicas.

16. The computer system of claim 14, wherein the step of the computer system indexing the selected proper subset of replicas includes the steps of:

the computer system determining index updates by determining keyword-to-replica mappings; and the computer system generating the unified content index based on the index updates.

17. The computer system of claim 16, wherein the step of determining the index updates includes the steps of:

the computer system determining index expectation scores and resource affinity scores for respective replicas in the selected proper subset of replicas; and the computer system sorting the selected proper subset of replicas based on the respective index expectation scores and the respective resource affinity scores.

18. The computer system of claim 17, wherein the method further comprises the step of the computer system receiving event monitoring data that indicates change(s) in the system, wherein the step of determining the index expectation scores for respective replicas in the selected proper subset of replicas includes the steps of:

based on the unified replication metadata model, the computer system determining temporal distances from the replicas in the selected proper subset of replicas to respective fully indexed replicas included in the plurality of replicas;

based on the received event monitoring data, the computer system determining measures indicating respective amounts of change in the system between timestamps of replicas in the selected proper subset of replicas and respective nearest fully indexed replicas included in the plurality of replicas; and determining the index expectation scores based on the temporal distances and the measures indicating amounts of change in the system.

19. The computer system of claim 17, wherein the method further comprises the step of the computer system determining a current usage of resources in the system and a threshold usage of the resources, wherein the step of determining the resource affinity scores for respective replicas in the selected proper subset of replicas includes the steps of:

if the current usage is less than the threshold usage, then the computer system determining an expected additional resource usage due to performing an indexing task online, and based on the expected additional resource usage, the computer system determining a resource affinity score for performing the indexing task online; and if the current usage is greater than or equal to the threshold usage, then the computer system determining an expected resource usage due to performing the indexing task offline and based on the expected resource usage, the computer system determining a resource affinity score for performing the indexing task offline.

* * * * *